June 1, 1937. C. DEKKER 2,082,688
ONION SET PLANTER
Filed Aug. 26, 1936
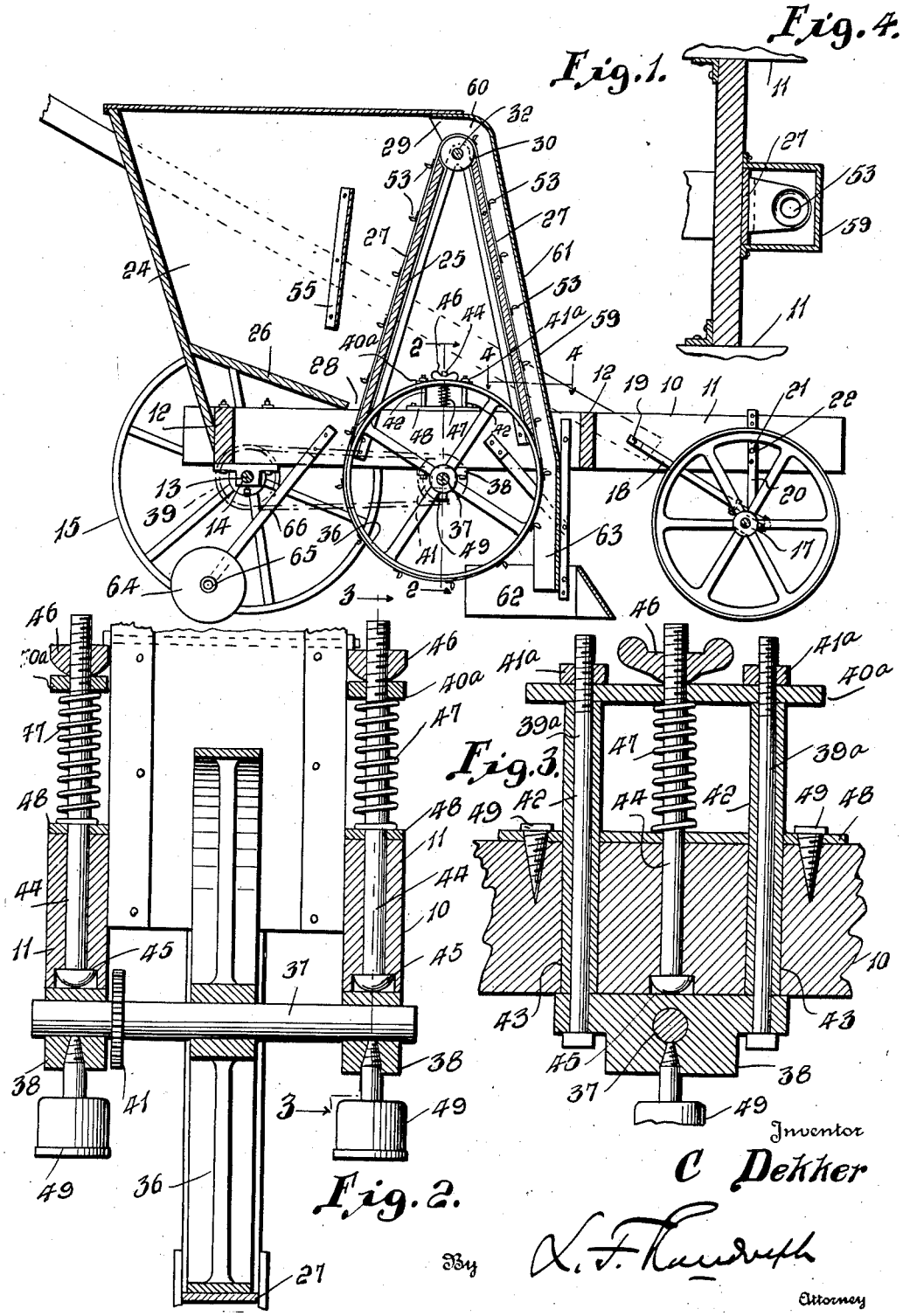
Inventor
C Dekker Patented June 1, 1937

2,082,688

UNITED STATES PATENT OFFICE 2,082,688

ONION SET PLANTER

Corneil Dekker, Oakglen, Ill.

Application August 26, 1936, Serial No. 98,037

1 Claim. (Cl. 74—242.14)

This invention relates to a machine for planting or sowing onion sets, gladiolus bulbs and the like.

It is particularly aimed to provide a construction which is improved over that disclosed in Letters Patent No. 1,926,476, issued to me on September 12, 1933, for an onion set planter, as concerns the operating and tensioning of the planter belt.

The more specific objects and advantages will become apparent from a consideration of the description following taken in connection with accompanying drawing illustrating an operative embodiment.

In said drawing:—

Figure 1 is a view of the planter in substantially central longitudinal section;

Figure 2 is a vertical sectional view, on an enlarged scale, taken on the plane of line 2—2 of Figure 1;

Figure 3 is a sectional view taken substantially on the plane of line 3—3 of Figure 2, and Figure 4 is a sectional view taken on the line 4—4 of Figure 1.

Referring specifically to the drawing, the planter comprises a suitable frame 10 made up of side beams 11 and transverse beams 12 connecting them.

Such frame mounts a rear axle 13 which is journaled in bearings 14 on the frame, and on which axle rear ground wheels 15 are keyed. At the front of the machine, a central ground wheel 17 is provided, the same being journaled on an axle carried by bars 18 and pivoted at 19 to the beams 11. Bars 18 are suspended by bars 20 which are pivoted thereto at 21 and which are adjustably secured in place by bolts 22 passing through a series of openings 23 thereof. Through the adjustment of the bolts 22, the height of the front wheels may be varied to regulate the depth of operation of the machine.

Suitably secured to the frame 10 is a hopper 24 adapted to contain onion sets, gladiolus bulbs, or the like to be planted. The front wall of the hopper is shown at 25 and inclined upwardly and forwardly. The bottom wall of the hopper 26 inclines downwardly and forwardly so as to direct the sets or bulbs toward the wall 25.

An endless feed or planting belt is shown at 27 which passes interiorly of the hopper and over the wall 25, entering the hopper through an opening 28 in its bottom wall and leaving through an opening 29 at the top of the front wall. Such belt is trained over a pulley 30, adjacent such opening 29 which is keyed to a shaft 32. Shaft 32 is suitably journaled in bearings secured to the side members 11.

The belt 27 is also trained over a large pulley 36 keyed to a shaft 37, journaled in bearings 38 on the frame 10. Pulley 36 serves as the drive wheel for the belt, receiving its power from the rear axle 13, since the latter has a sprocket wheel 39 thereon driving a sprocket chain 40, which in turn is trained over a sprocket wheel 41 keyed to the shaft 37.

Said bearings or blocks 38 are mounted for vertical movement relatively to the frame 10. To this end, each bearing or block 38 has a pair of bolts 39ª rising therefrom and passing through a bar 40ª, the latter being secured in place by nuts 41ª on the bolts.

Sleeves or tubes 42 surround the bolts 39 and they are slidably mounted in vertical openings 43 in the side beams 11. A central bolt 44 rises through the side beams 11 being anchored against vertical movement by the head 45 thereof in a recess in such side beams.

The bolt 44 passes loosely through the bar 40ª and above the same has a nut 46 thereon, preferably of the winged type. An expansive coil spring 47 surrounds the bolt 44 and abuts the bar 40ª at one end. At its other end, it abuts a wear plate 48, screwed or otherwise fastened at 49 to the side beams 11. Said wear plate 48 has openings, as shown, through which the sleeves 42 slide and through which the bolt 44 passes. By reason of this construction, a single pulley is used at 36 which bridges the inclined runs of the planter belt and it is capable of being tensional to any desired degree through the operation of the nut 46 which serves to depress the bar 40ª, against the tension of the spring 47, and the bars in turn through their connection with the blocks or bearings 38, depressing them as well as the shaft 37 and pulley 36 thereon. Oil cups 49 may be carried by the bearings for efficient lubrication.

It will be seen that as the belt 27 ascends in the hopper 24, cups 53 thereon of any suitable shape, each receives and holds an onion set or the like, the same falling toward the same due to the inclination of the bottom 26. To prevent undue crowding of the onion sets or the like towards the belt and front wall 25, a guard member is provided at 55.

A relatively narrow hood of inverted U-shape in cross section, is provided at 59 over the forward run of the conveyor 27, its uppermost portion 60 extending through the opening 29 into the hopper and its forward portion approximating the vertical as at 61 and terminating relatively close to the ground and serving to guide the onion sets or the like, in discharging into the furrow.

Slightly in advance of the portion 61 is a suitable furrow opening plow means 62, supported from the machine by suitable bars as at 63. The onion sets or the like will drop into the furrow opened by the plow 62 and such furrow after the dropping of the sets will be covered by the diverging wheels or disks (as disclosed in my aforesaid patent) which are journaled on stub shafts 65 carried by mounting brackets 66 or the like secured to the frame members 11.

Various changes may be resorted to provided they fall within the spirit and scope of the invention.

I claim as my invention:—

A machine of the class described having an endless planting belt, pulleys over which the belt passes arranging it in an up run and a down run, means to drive one of said pulleys, a shaft for the last mentioned pulley, bearing means for said shaft, a frame, means on the frame operable to vary the position of said bearing means to thereby tension the belt, comprising elements connected to the bearing means and slidably mounted in said frame, a bar connecting the elements above the frame, a bolt anchored to the frame and passing through the bar, an expansive spring between the frame and the bar, a nut on the bolt operable against the bar to depress said elements, said elements comprising bolts passing through the bar, sleeves surrounding the last mentioned bolts, and wear plates on the frame through which the bolts and sleeves pass.

CORNEIL DEKKER.